(12) United States Patent
Walley et al.

(10) Patent No.: US 6,384,780 B2
(45) Date of Patent: May 7, 2002

(54) EXTENSION OF DYNAMIC RANGE OF EMITTER AND DETECTOR CIRCUITS OF SPREAD SPECTRUM-BASED ANTENNA TEST RANGE

(75) Inventors: George M. Walley, San Jose, CA (US); Daniel L. Boritzki, Palm Bay, FL (US); William D. Killen; Michael P. Zeitfuss, both of Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/777,214

(22) Filed: Feb. 5, 2001

Related U.S. Application Data

(63) Continuation of application No. 09/294,940, filed on Apr. 20, 1999, now Pat. No. 6,184,826.

(51) Int. Cl.[7] ................................................. H01Q 3/00
(52) U.S. Cl. ........................ 342/360; 375/140; 375/146
(58) Field of Search ........................ 342/360; 375/140, 375/146

(56) References Cited

U.S. PATENT DOCUMENTS

| | | | |
|---|---|---|---|
| 4,937,584 A | 6/1990 | Gabriel et al. | 342/378 |
| 5,170,411 A | 12/1992 | Ishigaki | 375/1 |
| 5,363,403 A | 11/1994 | Schilling | 375/1 |
| 5,371,505 A | 12/1994 | Michaels | 342/360 |
| 5,396,255 A | 3/1995 | Durkota et al. | 342/360 |
| 5,467,368 A | 11/1995 | Tekeuchi et al. | 375/206 |
| 5,493,304 A | 2/1996 | Lee et al. | 342/360 |
| 5,534,871 A | 7/1996 | Hidaka et al. | 342/113 |
| 5,553,062 A | 9/1996 | Schilling | 370/18 |
| 5,675,608 A | 10/1997 | Kim et al. | |

*Primary Examiner*—Theodore M. Blum
(74) *Attorney, Agent, or Firm*—Allen, Dyer, Doppelt, Milbrath & Gilchrist, P.A.

(57) ABSTRACT

An antenna test range uses a direct spread-spectrum based test signal to effectively electronically reject all unwanted signals that may be present in the test range, and thereby allow both main beam and off-axis performance of the antenna to be completely and accurately measured. For increased dynamic range, the test signal comprises a carrier signal that is sequentially modulated with low rate, respectively different, direct spreading PN sequences applied to a cascaded plurality of N mixer stages through successive ones of which the carrier signal is coupled. The plurality of PN spreading sequences are mutually offset in time by a fraction of a chip, and thereby produce, at an output of an Nth mixer stage, a direct sequence spread spectrum carrier signal having its energy spread out over a bandwidth that is N times the spreading bandwidth of an individual one of the PN spreading sequences.

6 Claims, 5 Drawing Sheets

EXTENSION OF DYNAMIC RANGE OF EMITTER AND DETECTOR CIRCUITS OF SPREAD SPECTRUM-BASED ANTENNA TEST RANGE

CROSS-REFERENCE TO RELATED APPLICATIONS

This application is a continuation of Ser. No. 09/294,940 filed on Apr. 20, 1999 now U.S. Pat. No. 6,184,826. The subject matter of the present invention relates to that disclosed in U.S. patent application, Ser. No. 09/295,015 now U.S. Pat. No. 6,236,362 filed coincident herewith, entitled: "Mitigation of Antenna Test Range Impairments Caused by Presence of Undesirable Emitters," by M. Walley et al (hereinafter referred to as the '362 patent), assigned to the assignee of the present application, and the disclosure of which is incorporated herein.

FIELD OF THE INVENTION

The present invention pertains in general to communication systems, and is particularly directed to an improved PN sequence multiplier-generator and its use as a mechanism for extending the dynamic range of test signal emitter/detector components of an antenna test range, that uses direct spread-spectrum test signals to mitigate against measurement impairments, such as those caused by multipath and or the presence of one or more interfering emitters or to prevent interference of signals in a licensed frequency band.

BACKGROUND OF THE INVENTION

As described in the above-referenced '362 patent, historically the design and testing of radio wave antennas has been principally concerned with antenna gain along its boresight (main beam axis). For this purpose, as shown diagrammatically in FIG. 1, an antenna 10 the performance of which is to be measured may be mounted within an indoor compact test range 12, such as an EMI-shielded anechoic chamber, that is configured to eliminate reflections and interference from unwanted sources of electromagnetic radiation.

Testing of any antenna typically involves directing radio wave emissions from a test signal source 14 toward the antenna, and measuring the antenna's response by a range receiver 16, the output of which may be displayed or recorded via an associated test and measurement workstation 18. Varying the primary axis of the antenna 10 and test signal source 14 (for example, by varying the orientation in orthogonal principal planes of either the antenna or the test source), enables both boresight and off-axis flexibility of performance parameters including gain, polarization, etc., of the antenna to be measured.

Unfortunately, at relatively low frequencies (e.g., UHF), the size of the indoor test range needed to test the antenna becomes physically and cost-wise prohibitive, making it necessary to test the antenna outdoors. While finding an 'open air' location to set up an antenna test range that is free of interferers may not have been particularly difficult several decades ago, it has recently become a significant problem, principally as a result of the proliferation of wireless commercial products, such as cellular phones and citizen band radios, as well as specular reflections from buildings and the like. Moreover, not only should the test range be free of interference from outside sources, but it is desired that the test range emissions themselves not interfere with other 'off-range' communication equipment. This interference and reflection free test range problem is compounded by the fact that, in addition to measuring main lobe performance, antenna designers are interested in the antenna's off-axis or sidelobe characteristics, that will allow placement of nulls on one or more interferers, such as a cellular radio transmission tower.

Advantageously, the invention described in the '362 patent is designed to effectively alleviate this test range impairment problem by employing a spread spectrum signal as the test signal. Because a spread spectrum signal has high autocorrelation properties with itself and high cross-correlation properties with other signals including interferers, as well as time delayed versions of itself due to specular reflection from multipath, it provides a means for enabling only the intended receiver that processes the energy received by the antenna under test to electronically reject all other signals that may be present in the test range, and thereby allows both main beam and sidelobe, off-axis performance of the antenna to be accurately measured, while also preventing interference with other communication equipment.

Now even though spread spectrum signal processing provides an effective means of achieving many dB of processing gain, by spreading out over a wide bandwidth and thereby substantially reducing the influence of energy from unwanted test range interferers, the degree of improvement may be influenced by operational conditions of the test range and circuit parameters of the test range equipment.

For example, as diagrammatically shown in FIG. 2, where the test signal source 14 is positioned at an off-axis location 15 for the purpose of conducting a sidelobe measurement, the presence of a strong interferer 21 in the antenna's main beam 11 (which typically has a substantially larger gain than a sidelobe), may diminish the ability to resolve the sidelobe.

To overcome this problem it is necessary to increase the spreading processing gain—namely substantially increase the chip rate of the spreading sequence of the test signal. While this can be achieved using very high speed electronic components, doing so may add a substantial cost to both the test signal emitter and the receiver processing equipment. A second problem is the fact that reasonably priced RF mixer circuits that are used to modulate the RF carrier with the spreading signal, suffer some degree of leakage of the local oscillator signal (e.g., as a 30 dB down spur). While this carrier spur leakage problem can also be reduced by using more complex mixer circuitry (which usually requires very fine tuning), such circuitry would also add further expense to the test signal generator and receiver processing equipment.

SUMMARY OF THE INVENTION

In accordance with the present invention, these potential problems are successfully remedied by configuring the test signal emitter to include a cascaded arrangement of relatively inexpensive (leaky) mixer stages through which the RF carrier is successively conveyed. Each successive mixer stage of the local oscillator's cascaded transport path is fed with a respectively different, relatively low rate, PN spreading sequences, that is offset in time by a fraction of a chip from the sequence applied to an adjacent mixer.

Sequentially cascading the PN sequence by carrier-multiplying mixer stages in this manner produces an output carrier the energy in which is now spread out over the very wide bandwidth of the resultant PN sequence, whose chip rate corresponds to that of an individual one of the respective PN sequences times the number of cascaded stages. This not only allows the use of relatively low chip rate (and therefore inexpensive) PN generator components to substantially enhance spreading processing gain, but significantly reduces the net leakage of the local oscillator carrier spur output at the downstream end port of the cascaded mixers.

DETAILED DESCRIPTION

Figure 1:
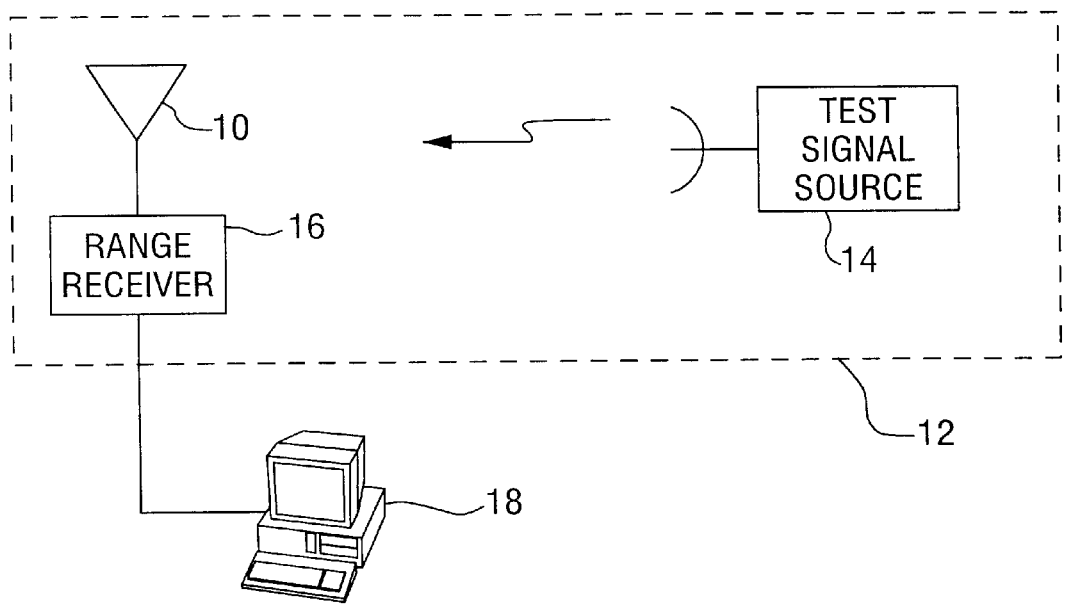
FIG. 1 diagrammatically illustrates a compact, indoor antenna test range.

Before describing in detail the new and improved PN sequence multiplier-generator in accordance with the present invention, and its use in extending the dynamic range of spread spectrum-based test signal emitter/detector components of an antenna test range, it should be observed that the invention resides primarily in a prescribed arrangement of conventional communication circuits and associated digital signal processing components and attendant supervisory control circuitry therefor, that controls the operations of such circuits and components.

Consequently, the configuration of such circuits components and the manner in which they are interfaced with other antenna test range equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the PN sequence multiplier-generator and its use in an antenna test range in a convenient functional grouping, whereby the present invention may be more readily understood.

Figure 3:
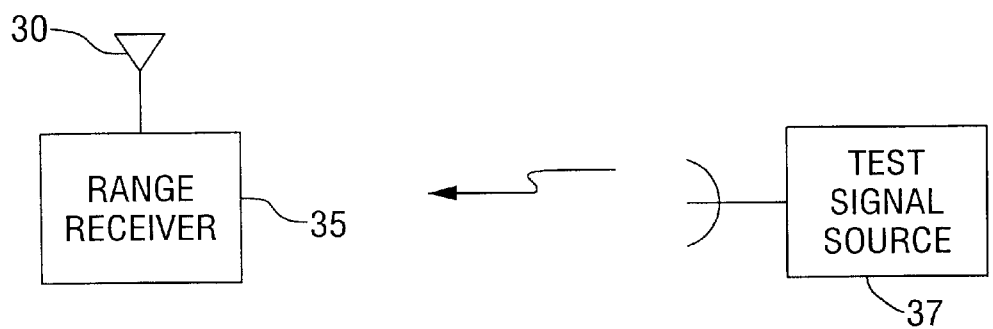
FIG. 3 diagrammatically illustrates an embodiment of an antenna test range of the type described in the above referenced '362 patent, that employs a spreading sequence based test signal source to mitigate against the presence of test range impairments.
Figure 2:
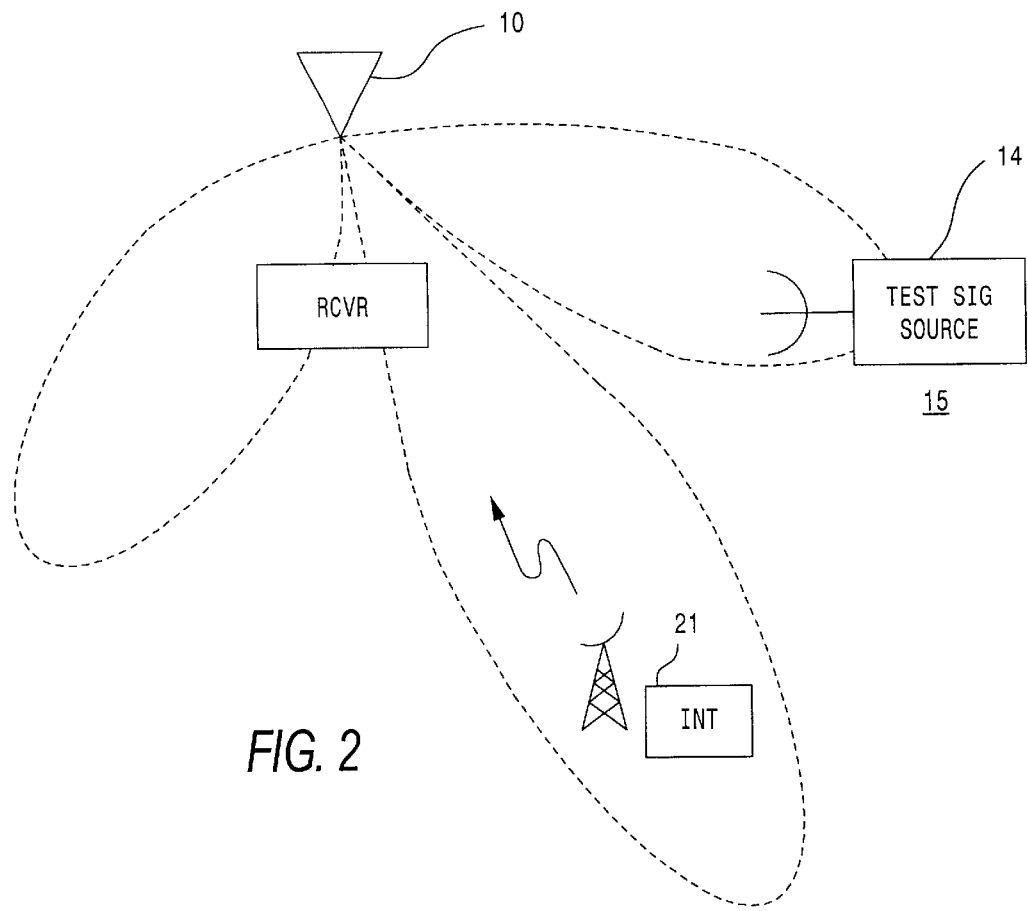
FIG. 2 diagrammatically illustrates an outdoor antenna test range, in which a test signal source is positioned in an off-axis location and an interferer is located in the antenna's main beam.

FIG. 3 diagrammatically illustrates an embodiment of an antenna test range of the type described in the above referenced '362 patent, that employs a spreading sequence based test signal source to mitigate against the presence of test range impairments, such as but not limited to specular reflections or signals emitted from one or more 'interference' sources that may be incident on an antenna whose performance is to be measured. The antenna 30 may be fixedly mounted at a prescribed location at which measurements are to be conducted by way of associated range receiver equipment 35 connected to the antenna 30. Radio wave emissions in the band of operation of the antenna are directed from a test signal source 37 toward the antenna 30, and the response of the antenna 30 is measured by means of the range receiver equipment 35. To measure the antenna's performance gain parameters (including gain, polarization, etc.) for variations in the principal planes, the antenna's response may be monitored as the antenna's boresight axis is moved in the principal planes relative to the test range signal source. As detailed in the '362 patent, the potential impairing influence of reflections, such as those from a building 34 and/or emissions from 'interference' sources such as a cellular radio 33, are readily mitigated by using a direct spread-spectrum signal as the test signal waveform.

Figure 4:
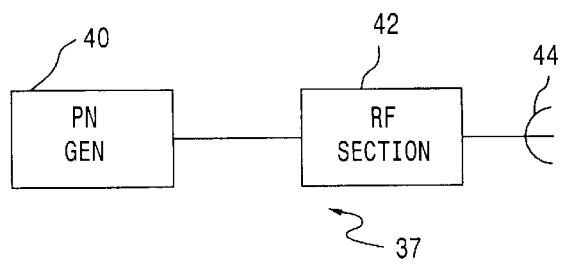
FIG. 4 diagrammatically illustrates a direct spread-spectrum signal based test signal source for use in the antenna test range of FIG. 3.

For this purpose, as shown in FIG. 4, a carrier-spreading pseudo-random chip sequence is produced by a pseudo random noise (PN) generator 40, the output of which is a 'spread' or 'chipped' data stream having a prescribed number of chips per baud. The chip sequence is coupled to the test source's RF section 42, which may comprise an RF mixer and bandpass filter, as a non-limiting example. The resulting spread RF test carrier produced by the RF section 42 is then transmitted via a test source antenna 44 along a prescribed transmission axis toward the antenna under test.

Figure 5:
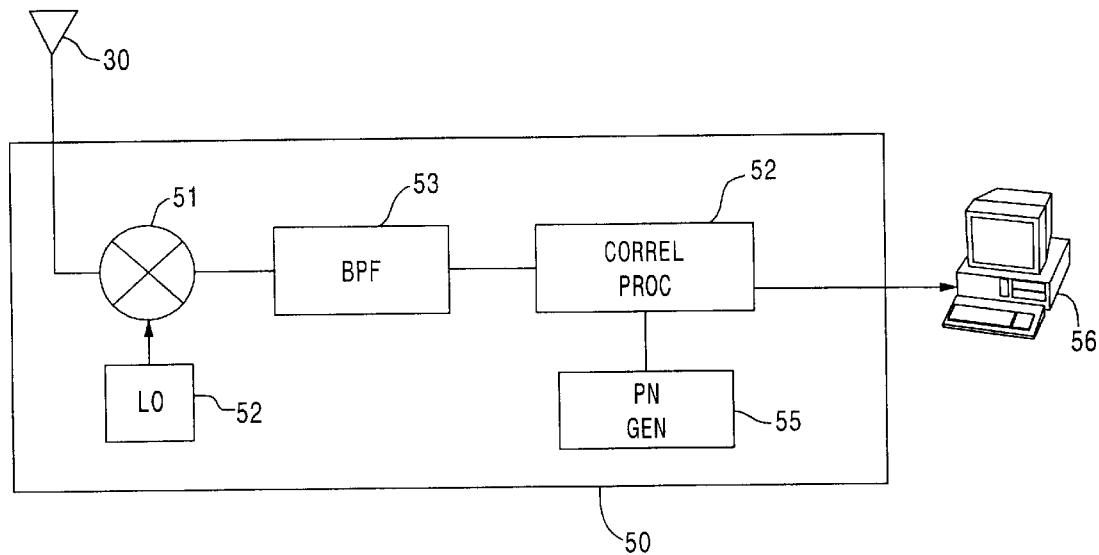
FIG. 5 diagrammatically illustrates the configuration of range receiver equipment for the antenna test range of FIG. 3.

A non-limiting example of range receiver equipment, to which the output of the antenna under test is coupled, is shown diagrammatically in FIG. 5, as comprising an RF receiver-despreader section 50, which receives the spread test signal emitted by the test signal source and despread-correlation processes the received signal to recover the earliest line-of-sight emission from the test source. For this purpose, the receiver section 50 may include a mixer 51 to which the output of a local oscillator 52 is applied, to provide a baseband spread signal that is coupled through a bandpass filter 53 to a correlation processor 54. The correlation processor is coupled to receive a spread-spectrum reference signal pattern produced by a pseudo random noise (PN) generator 55. The PN generator 55 is operative to generate the same direct spreading PN sequence employed by the test signal source of FIG. 4, described above.

Impairments due to multipath are readily avoided by selecting the earliest-in-time correlator output signal whose energy content exceeds a prescribed threshold to identify the first-to-arrive (line-of-sight) test signal of interest. RF emissions other than those sourced from the test signal source are avoided, since the energy in the correlator output for such other emissions is highly cross-correlated (rather than highly auto-correlated) with the reference PN sequence, and therefore effectively nulled out. The energy in the highly auto-correlated (first-to-arrive) output of the correlator processor 54 is digitized and processed by way of the antenna performance measurement algorithm executed by a workstation 56.

As pointed out above, the degree of impairment rejection provided by such use of spread spectrum signal processing may be influenced by operational conditions of the antenna test range (such as the presence of an interferer in the main lobe, which might overwhelm a test signal from the direction of the side lobe), and performance parameters of its circuit components (e.g., carrier spur leakage through RF mixer circuitry). To overcome the effect of the relatively large ratio of main lobe gain to sidelobe gain, it is necessary to increase the spreading processing gain—namely, substantially increase the chip rate of the spreading test signal.

Figure 6:
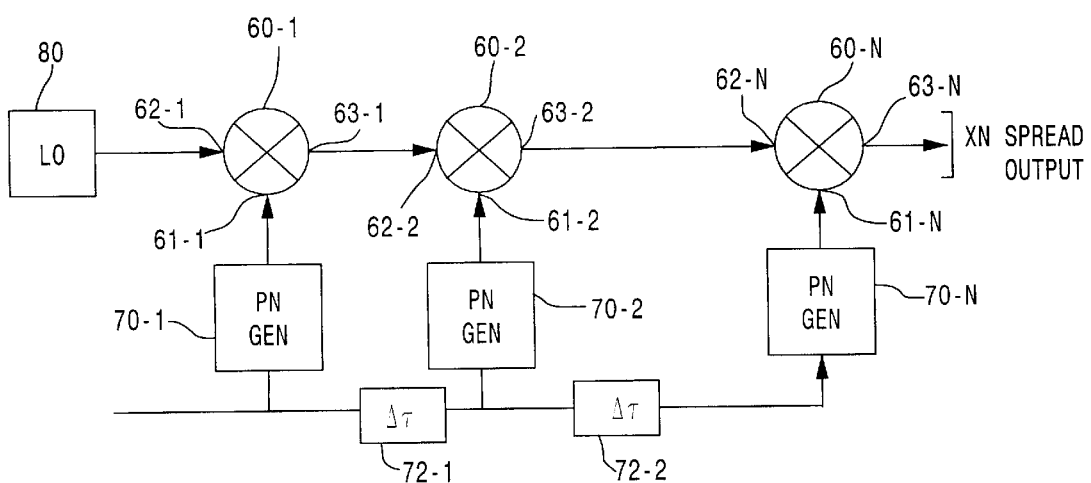
FIG. 6 diagrammatically illustrates a XN multiplied PN sequence spreading signal generator in accordance with the present invention.

In accordance with the present invention, this performance improvement is readily accomplished by means of a spreading signal generator implementation, diagrammatically illustrated in FIG. 6, that also suppresses carrier leakage using low cost PN generator and carrier mixer components. More particularly, FIG. 6 shows the test signal generator of FIG. 4 implemented in accordance with the present invention as a cascaded arrangement of N, relatively inexpensive (leaky) mixers 60-1, 60-2, . . . , 60-N. Since cascading the mixers 60 has the effect of significantly attenuating local oscillator leakage at each stage (e.g., by 30 dB per stage), over a series of N stages, the total RF carrier spur leakage realized at the downstream end of the cascaded mixer arrangement of some plurality of N mixer stages will be well suppressed.

In the cascaded PN generator-mixer arrangement of FIG. 6, first inputs 61-1, 61-2, . . . , 61-N of the mixers are coupled to PN generators 70-1, 70-2, . . . , 70N. These PN generators produce N respectively different, relatively low rate, PN spreading sequences, which are mutually offset in time by a fraction of chip, via delay units 72-1, 72-2, . . . The cascaded carrier path has the second input 62-1 of mixer 60-1 coupled to receive a carrier frequency signal generated by a local oscillator 80. The output 63-1 of mixer 60-1 is coupled to the second input 62-2 of mixer 60-2; the remaining mixers 60-3 . . . 60-N have their second inputs similarly cascaded with outputs of successively upstream mixers, as shown.

With this relatively simple cascaded mixer-PN generator architecture, the output 63-N of mixer 60-N yields a carrier frequency whose energy is spread out over the very wide bandwidth (that of the resultant PN sequence, having a chip rate that corresponds to that of an individual one of the respective PN sequences times the number of cascaded mixer stages). As described above, this not only allows the use of relatively low chip rate (and therefore inexpensive) PN generator components to achieve the desired enhanced spreading processing gain, but significantly reduces the net leakage of the local oscillator carrier spur output at the downstream end port of the cascaded mixers.

The manner in which the correlation and tracking of the spread spectrum receiver section of the test range receiver equipment of FIG. 5 is implemented and operated to despread the very wide bandwidth PN sequence produced by the test signal generator of FIG. 6 will now be described with reference to FIGS. 7–10. In order to understand the detailed implementation of the correlation and tracking of the spread spectrum receiver, it is useful to review some basic aspects of spread spectrum signal processing.

Figure 7:
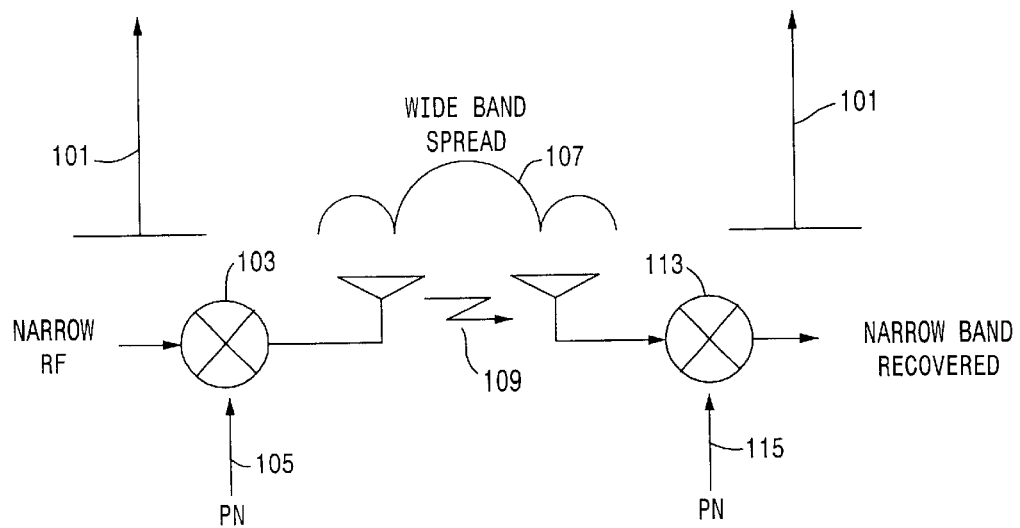
FIG. 7 diagrammatically illustrates a despreader for despreading the XN multiplied PN sequence spreading signal produced by the generator of FIG. 6.

In a basic spread spectrum communication system as diagrammatically illustrated in FIG. 7, a narrow band RF signal 101 is used as the local oscillator for modulation in a mixer 103 by a pseudo noise (PN) sequence 105 at a high rate. This has the effect of spreading the energy of the originally narrow band signal 101 into a much broader band or 'spread' signal, shown at 107, for transmission over the communication link 109. The area encompassed by the narrow band RF signal 101 is the same as the area under the wide band spread signal 107. Therefore, the apparent power in a particular signal bandwidth decreases by sacrificing bandwidth.

On the receive side of the communication link 109, if the received spread RF signal is again modulated in a mixer 113 by a PN sequence 115 that is identical to the PN sequence 105 used at the transmitter, and at the same time and phase as the transmitter's PN sequence 105, the effects of spreading the received signal is reversed and the spread spectrum signal 107 collapses back to the original narrow band RF signal 101.

Figure 8:
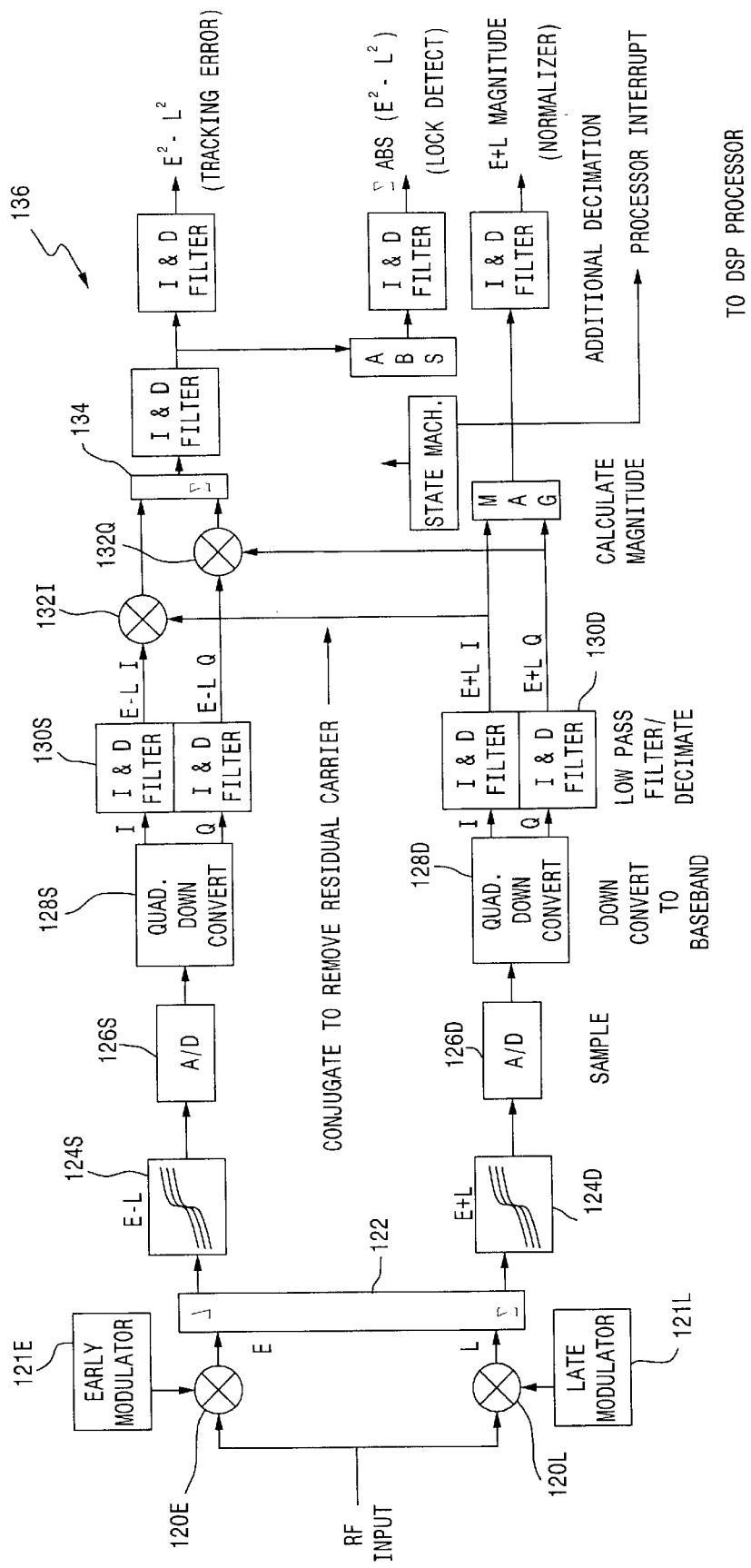
FIGS. 8 and 9 show the general architecture and operation of a high performance PN tracking circuit.
Figure 9:
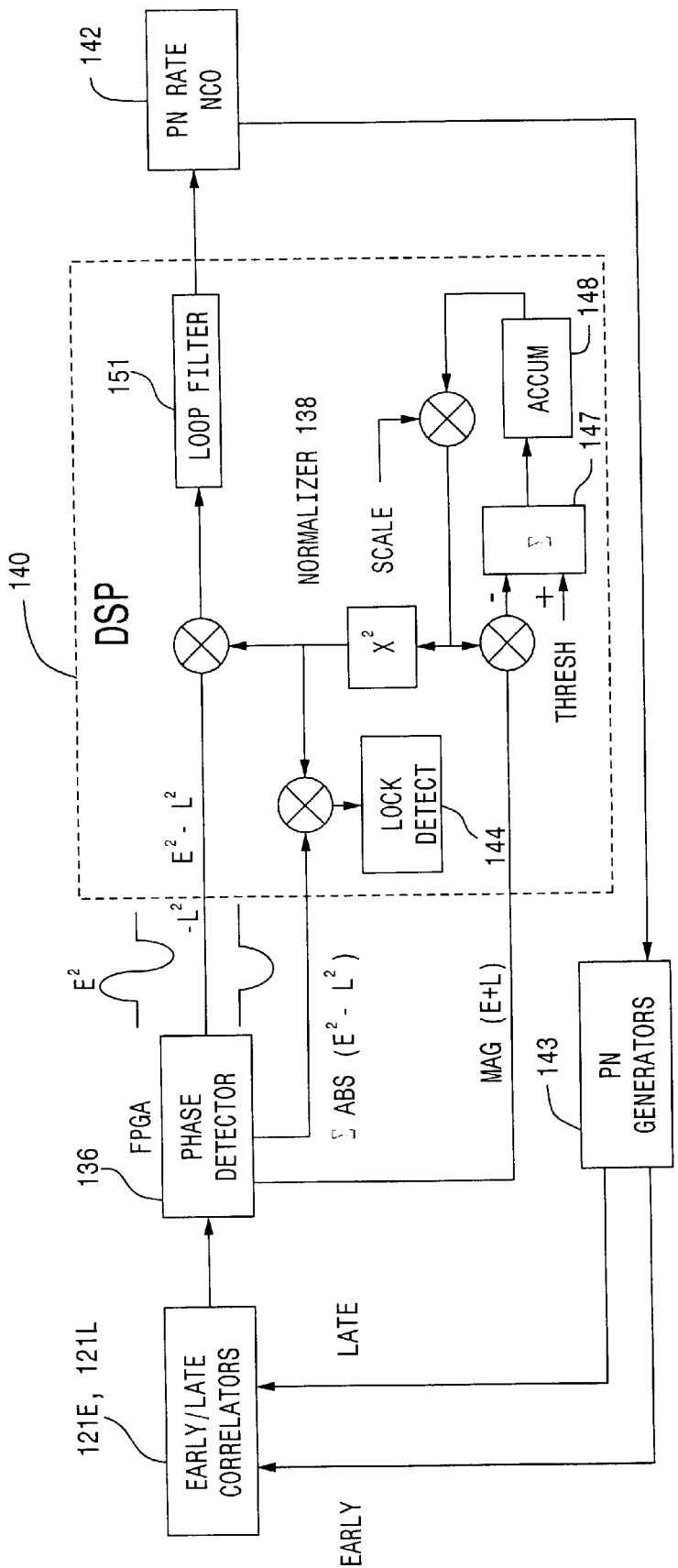

Before describing the general architecture and operation of the high performance PN tracking circuit of FIGS. 8 and 9, it is useful to define terms that are employed to describe a spread spectrum system. A 'chip' for the purpose of the present discussion is defined as a binary 1 or 0, that is generated by the pseudo noise (PN) generator used to spread or de-spread the narrow band RF carrier. In the test signal generator described above, the PN sequence is comprised of a combination of multiple PN generators. The period of a single chip is considered a chip-time, having a reciprocal that is defined as the chip rate and is sometimes referred to as the PN rate.

In an antenna test range, since the receive side of the system is on the other or geographically 'far' side of the test range from the modulator-source, it is necessary to determine the proper PN timing needed to perform the de-spreading function. First, the de-spreader must determine the proper PN time, and then it must track changes in PN rate due to any system induced offsets. There are several methods commonly used in communications technology to achieve PN tracking. The most common are Early-Late gate and tau-dither, which may be implemented by a variety of approaches. The preferred approach is to provide the transmitter and receiver with a common reference, so that no tracking is required, since the PN chip rate of the transmitters and that of the receiver can be phase-locked to that common reference.

FIGS. 8 and 9 diagrammatically illustrate an Early-Late gate scheme that combines discrete hardware with a digital signal processor (DSP) to aid in the acquisition and tracking of the PN sequence. The PN tracking loop architecture of FIGS. 8 and 9 has a number of refinements over the simplistic approach, described above, but implements an Early-Late gate tracking loop. The tracking operation will be describe first, as it is less complicated than acquisition and many of the parameters used in its analysis are useful in explaining the acquisition process.

Three PN sequences are generated—termed Early (E), On-Time (OT), and Late (L). These PN sequences are delayed in time relative to each other by 1/2 chip. When the loop is tracking, the On-Time (OT) PN sequence is perfectly aligned in time with and thereby fully correlated with the transmitted PN sequence as it arrives at the demodulator.

There is a partial correlation of the received RF signal applied to respective Early and Late mixers 120E and 120L for the Early and Late channels, since each Early and Late channel is offset in time by 1/2 chip from the fully correlated On-Time channel. Essentially, if the Early and Late correlated signals are equal, then the On-time channel will be perfectly centered between them. The resulting IF signals produced by the despread operations on the Early and Late channels are applied to a sum and difference circuit 122, wherein they are summed with and subtracted from each other to produce respective E+L and E−L signals.

These signals are filtered in respective filters 124S and 124D and the resulting IF carrier is digitized in respective analog-to-digital converters (ADCs) 126S and 126D, and then digitally quadrature down-converted by way of down-converters 128S and 128D to eliminate any DC offsets created by the mixing or A/D conversion. The resulting I and Q signals for each of the sum and difference channels are then filtered and decimated in respective I&Q units 130S and 130Q, to reduce the detection bandwidth.

The (I and Q) E+L channels are multiplied by the (I and Q) E−L channels, in respective multipliers 132I and 132Q and the products are summed in adder 134 to produce an output $E^2-L^2$ tracking error signal, with the E+L channel being conjugated to eliminate the effects of small residual frequency offsets in the channel. In other words, the carrier power is detected without the use of a carrier tracking loop. This $E^2-L^2$ tracking error signal is the phase detector error signal of a digital phase locked loop 136 that tracks the PN rate.

When the transmit PN sequence is aligned with the Early correlator, all the signal power is in the Early channel, with none in the Late channel; therefore, the result of $E^2-L^2$ tracking error is equal to +P. When the transmit PN sequence is aligned with the Late correlator, all the signal power (P) is in the Late channel and therefore the result of $E^2-L^2$ tracking error is equal to −P. When the correlation is aligned with the On-Time correlator, an equal amount of power will be in each of the Early and Late channels, and therefore the tracking error ($E^2-L^2$) will go to zero. This also eliminates the possibility of offsets in the tracking error signal being caused by variations in gain of the E+L channel versus the E−L channel.

Multiplying respective loop gains G1 and G2 by the sum and difference channels as G1(E+L)×G2(E−L) yields G1×G2×($E^2-L^2$). When $E^2-L^2$ goes to zero, the tracking error goes to zero, even if the two IF channels are not perfectly matched. The DSP, shown by way of a functional block diagram 140 in FIG. 9, performs the second order loop filter function of the PN tracking loop.

The normalizer section 138 keeps the gain of the tracking loop constant over variations in signal strength and signal to noise ratio. Maintaining a constant loop gain allows the loop bandwidth to remain constant under these changing conditions. The loop filter sets the tracking loop bandwidth. The correlators 115 provide the tracking phase error signal that is then filtered by the DSP 140 and the result controls the frequency of a numerically controlled oscillator (NCO) 142, which alters the correlation point of the PN sequence produced by PN generator unit 143 until the tracking error goes to zero.

The acquisition process consists of several sequential steps that are executed by a state machine within the software of the DSP 140. At the start of the acquisition routine, the length of one of the chips in the PN sequence by 1/2 chip is extended by causing the logic in the field programmable gate array (FPGA) to absorb one 2×PN rate clock cycle. To trigger this event, a dummy write-to-port within the FPGA may be used. This elongation of the PN sequence on demand appears as an instantaneous movement, or a step in PN time by 1/2 chip. These 1/2 chip steps are used to search for the proper alignment of the PN sequence.

The PN sequence correlation process can occur even when a small residual carrier offset is present. The total amount of uncertainty is broken up into discrete frequency slices or bins.

These bins are searched until the limits are reached, or lock is detected by a lock detector 144. If lock is not detected, the bin search is repeated. It should be noted that bin searching becomes necessary only if the initial frequency uncertainty is outside the lock detection bandwidth. Lock detection is based on detecting the presence of carrier energy in a particular bin when the PN sequence is correlated. In the case of an antenna range, stepping through the frequency bins is unnecessary.

When lock is detected, the lock detector 144 measures the level of the normalized sum of the absolute value of the tracking error (ΣABS ($E^2-L^2$)). When pure noise (N) or un-correlated signal plus noise (S+N) are all that is present at the input to the lock detector 144, a normalizer 146 holds the average value of this noisy signal at a constant predetermined level. Once PN correlation occurs, the output of lock detector 144 will drop by an amount proportional to the square root of the SNR. The longer the output of the lock detector is integrated, the lower will be the variance of the output of the lock detector around its average value.

The tracking error signal ($E^2-L^2$) is also examined. An integration of this parameter will go to zero when there is only noise, no correlation, or if PN correlation has been achieved with no rate offset. If the energy $E^2$ in the Early signal or the energy $L^2$ in the Late signal is larger than a given value, it is used as a secondary indicator that the PN is near the proper correlation point. A tracking loop filter 151 will attempt to pull the PN sequence into lock. The length of the integration of the lock detector output is the dwell time at a particular 1/2 chip correlation interval, typically referred to as a PN step. After each dwell time, if the output of the lock detector 144 is not below an empirically derived threshold 153, or the absolute value of the integration of the $E^2-L^2$ is less than a secondary threshold, then another step of the PN is initiated and the above process is repeated.

In the verify state, the tracking loop switches to second order and allows the tracking loop to pull the PN loop very close to perfect correlation. Only the output of the lock detector 144 is considered against a third and more difficult threshold and a much longer dwell time. Variance of the detection signal is extremely low after this long period of integration; after passing of this threshold, the state machine declares lock, and moves into the tracking state. If the lock detector fails the verify threshold operation, the state machine steps the PN and returns to the acquisition state described above.

In tracking mode, the loop bandwidth is narrowed. A long integration time is used against a relatively high threshold, such that only the variance caused by pure noise into the lock detector will eventually cause failure of the test indicating loss of lock. Preferably, the tracking loop is a second order phase locked loop using a lead/lag type loop filter. The state machine remains in this tracking state, until a loss of lock occurs. It then transitions to the acquisition state, described above, without changing the frequency bin. Under normal conditions, the despreader will remain in the tracking state for as long as the signal is present or until commanded to disable.

While in the tracking state, the DSP 140 sets the number of bins to be searched to only one bin, regardless of the initial configuration. In all other respects, reacquisition is the same as normal acquisition, described above. In order to resume a full acquisition frequency bin search, it is necessary to disable, reconfigure and enable the PN despreader.

As will be appreciated from the foregoing description, the considerable costs associated with using very high speed electronic components to increase spreading processing gain, and using complex mixer circuitry to minimize local oscillator spur leakage are effectively obviated in accordance with the invention by configuring the test signal emitter as a cascaded arrangement of relatively inexpensive (leaky) mixer stages through which the RF carrier is successively conveyed. By sequentially cascading the PN sequence through carrier-multiplying mixer stages that are fed with respectively different, relatively low rate, PN spreading sequences, offset in time by a fraction of a chip from the sequence applied to an adjacent mixer, the energy in the output carrier is spread out over the very wide bandwidth of the resultant PN sequence. This not only allows the use of relatively low chip rate and inexpensive PN generator components, but reduces the net leakage of the local oscillator carrier spur at the downstream end of the cascaded mixers.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method comprising the steps of:
   (a) coupling a carrier signal through N successive mixer stages; and
   (b) applying, to said N successive mixer stages, respectively different, relatively low rate, PN spreading sequences, that are mutually offset in time by a fraction of a chip, so as to produce, at an output of an Nth one of said mixer stages, a direct sequence spread spectrum carrier having its energy spread out over a bandwidth that is N times the spreading bandwidth of an individual one of said PN spreading sequences.

2. The method according to claim 1, further including the steps of:
   (c) launching the direct sequence spread spectrum carrier produced in step (b) as a test signal so that said test signal is be incident upon an antenna;
   (d) receiving said test signal at said antenna;
   (e) extracting energy in said test signal received at said antenna in step (d), while excluding energy in unwanted signals that may be incident upon said antenna, by correlating a signal demodulated from said test signal as received by said antenna with a replica of a PN spreading sequence for said test signal; and
   (f) processing said energy extracted in step (e) to derive a measure of at least one characteristic of said antenna.

3. The method according to claim 2, wherein step (c) comprises launching said test signal from a plurality of spaced apart locations having respectively different azimuth and elevation parameters relative to the boresight of said antenna.

4. A communication signal arrangement comprising:
   a cascaded arrangement of N mixer stages adapted to have a carrier signal coupled through successive ones thereof;
   a direct spreading PN generator that is operative to couple a plurality of different, relatively low rate, PN spreading sequences, mutually offset in time by a fraction of a chip, to respective ones of said N mixer stages, and thereby produce, at an output of an Nth mixer stage of said plurality of N mixer stages, a direct sequence spread spectrum carrier signal, energy of which spread out over a bandwidth that is N times the spreading bandwidth of an individual one of said PN spreading sequences.

5. The communication signal arrangement according to claim 4, further comprising:
   a test signal source that is operative to launch said direct sequence spread spectrum carrier signal as a test signal so that said test signal is incident upon an antenna spaced apart from said test signal source;
   a receiver coupled to demodulate a signal received by said antenna, and to correlate a replica of said PN spreading sequences of said test signal with the demodulated signal so as to extract energy in said test signal and exclude energy in unwanted signals that may be incident upon said antenna; and
   a signal processor, coupled to said receiver, and being operative to process the energy extracted by said receiver and derive a measure of at least one characteristic of said antenna.

6. The communication signal arrangement according to claim 5, wherein said test signal source is operative to launch said test signal from a plurality of spaced apart locations having respectively different azimuth and elevation parameters relative to the boresight of said antenna.

* * * * *